June 12, 1928.

F. C. FULCHER ET AL 1,673,743

STRAINING OR FILTERING APPARATUS

Filed June 12, 1924 4 Sheets-Sheet 2

Inventors
F. C. Fulcher
W. R. Bildam
Per Hubert Peake Atty.

June 12, 1928.  1,673,743

F. C. FULCHER ET AL

STRAINING OR FILTERING APPARATUS

Filed June 12, 1924     4 Sheets-Sheet 3

Inventors
F. C. Fulcher
W. R. Bildam

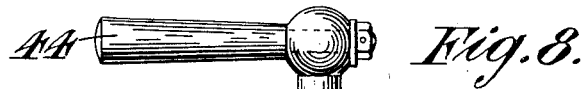
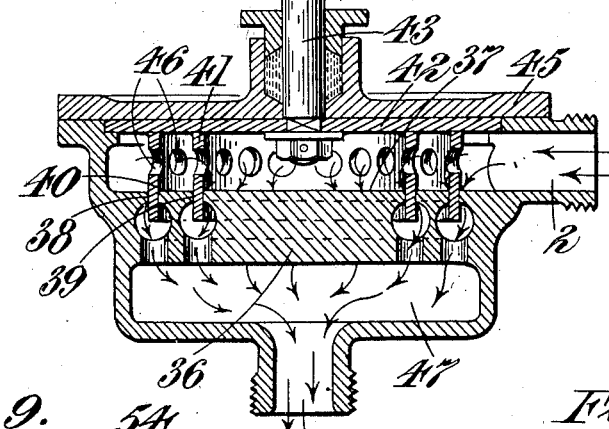
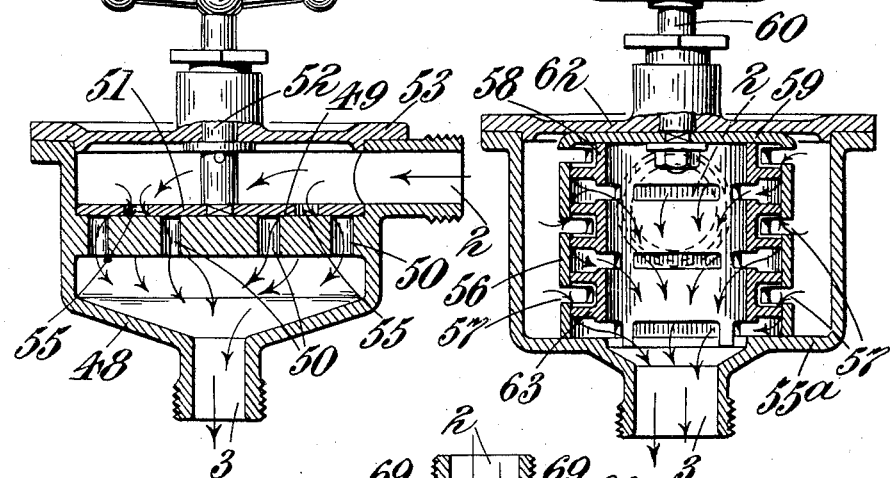
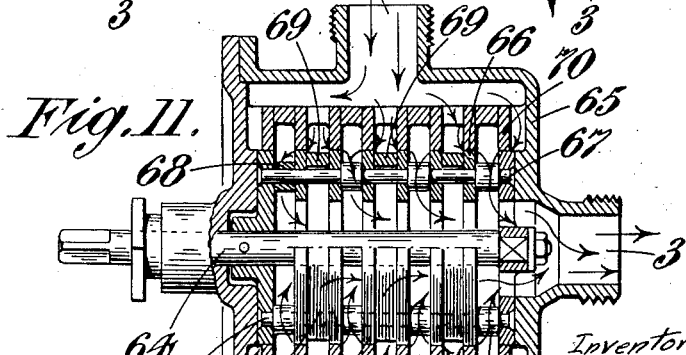

Patented June 12, 1928.

1,673,743

UNITED STATES PATENT OFFICE.

FRANK CHRISTIAN FULCHER AND WILLIAM ROBERT BELDAM, OF LONDON, ENGLAND.

STRAINING OR FILTERING APPARATUS.

Application filed June 12, 1924, Serial No. 719,661, and in Great Britain June 22, 1923.

This invention relates to straining or filtering apparatus for fluids and it has for its object to provide improvements by which certain advantages shall be obtained.

According to the present invention in a strainer for fluid there is provided a pair of relatively movable members whose adjacent surfaces contact and between which contacting surfaces the fluid is passed.

The strainer may be of the kind comprising a cylindrical straining wall having an outlet or an inlet for fluid, a circumferential slot or slots through which the fluid is strained and a scraper comprising a blade projecting into each slot and in permanent engagement therewith, the scraper and the cylindrical straining wall being angularly movable so that the blades will traverse the slots; such a strainer is described in the specification of the prior Letters Patent No. 1,414,120 granted to one of us.

Or the strainer may be of the kind described in the specification of Patent No. 1,581,998 in which the straining wall is constituted of a plurality of thin discs or plates mounted side by side on a carrier and each having a hole or holes therethrough, separators disposed between the adjacent discs or plates to space them apart and form endless peripheral slots, and a scraper blade or blades mounted on a carrier and permanently engaging the slots, the discs or plates and the scraper blades being relatively movable.

According to one construction of the present invention therefore, a strainer for fluid comprises a cylindrical straining wall having an outlet and an inlet for the fluid, a circumferential slot or slots, and an intermediate member extending into and the full length of each slot, and contacting with the adjacent walls of the slot, the said intermediate member or members and the cylindrical straining wall being relatively movable.

The cylindrical straining wall may be built up of a plurality of discs or plates having a hole or holes therethrough and the intermediate members projecting into the spaces between the said discs or plates may constitute the spacing means therefor.

A feature of the present invention also comprises the provision of a cut-away portion or portions on one or both of the relatively movable members which extends or extend over the adjacent member.

Forms of the present invention will now be described with reference to the accompanying drawings, wherein:—

Fig. 2 is a view in which the left hand portion is in end elevation looking in the direction of the arrow "X" of Fig. 1, and the right hand portion is a vertical section on the line A—B of Fig. 1;

Fig. 3 is a detail view in perspective showing the mode of mounting the strainer discs or plates and the intermediate members;

Figure 5:
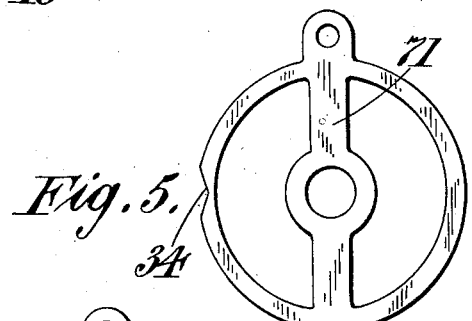
Figure 6:
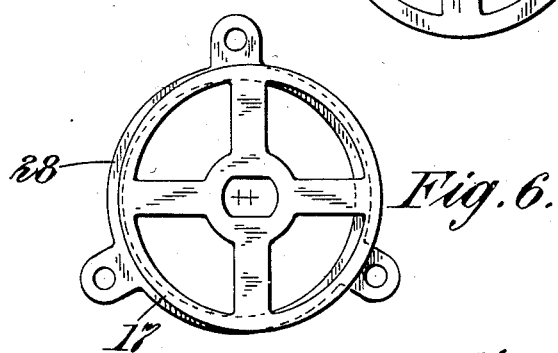
Figure 7:
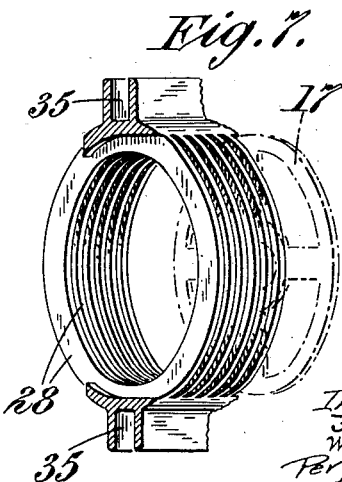

Fig. 5 one form of intermediate member;

Fig. 6 a modification of the invention in which the discs and the intermediate members are mounted eccentrically;

Fig 7 a further modification of the invention in perspective;

Fig. 8 a section of a further modification; and

Figs. 9, 10 and 11 sections of further modifications of the invention.

Figure 1:
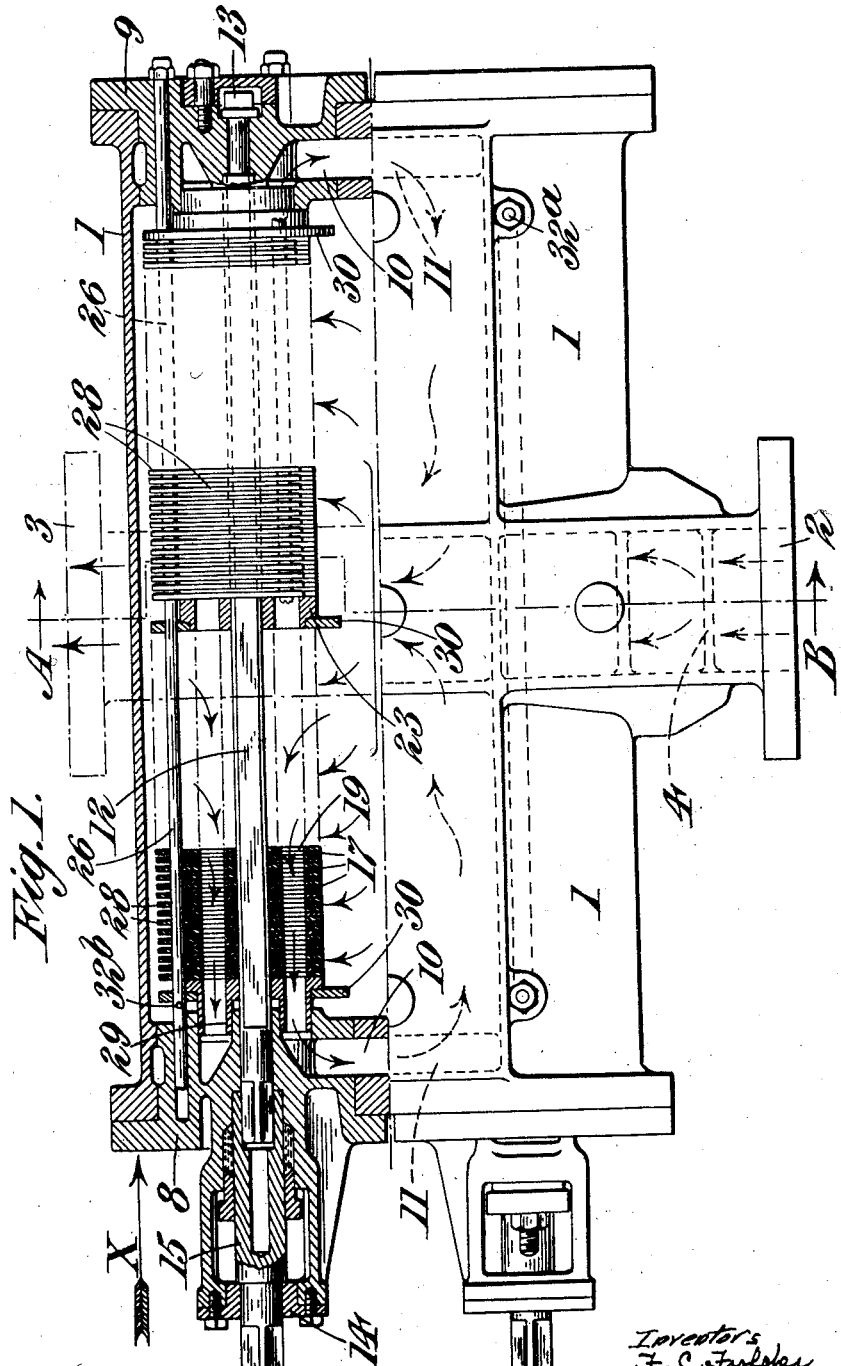
Fig. 1 is a plan view with the upper portion in section, of one embodiment of the invention.
Figure 4:
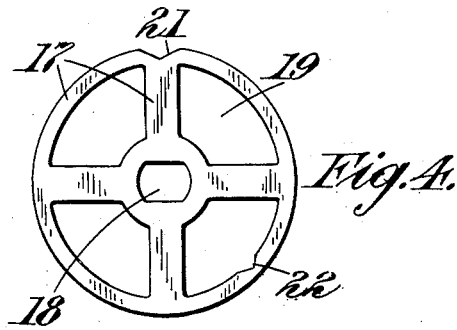
Fig. 4 shows one form of strainer disc or plate.

Figs. 1, 2 and 3 show a construction of strainer similar to that illustrated in Figs. 4, 2 and 3 of the drawings filed with the specification of the co-pending application Serial No. 677,000, but embodying the features according to the present invention.

1 is a casing within which four strainers arranged in two sets are mounted. Each set comprises two strainers disposed end to end or in line, the two sets of strainers being disposed side by side and parallel to one another. The casing has an inlet 2 and an outlet 3 and, internally, a wall 4 which separates the inlet from the outlet and also serves to direct the entering fluid towards the lower part of the casing, whence it rises and passes between and to the parallel sets of strainers. The wall 4 partly encircles one set of strainers, and to provide direct access for the entering fluid to parts of the strainers adjacent and partly encircled by the said wall it is provided with an orifice or orifices 5. The lower portion of the casing constitutes a sump 6, and is provided with a drain connection 7, for the removal of matter that fails to pass through the strainer. The casing 1 has an opening in each of its end walls opposite to each set of strainers, the openings in one end wall being closed by closures 8 and in the other end wall by closures 9. The closures 8, 9 are removably secured in position and each is provided with a duct or ducts extending from its inner face to a groove 10 in a peripheral portion by which, when the closure is in position, connection is made with the outlet 3 through a duct 11 arranged in the casing 1.

One set of strainers and the mode of mounting and assembling the constituent parts will now be described, the construction, mounting and assembling of the other sets of strainers being identical.

12 is a shaft rotatably mounted in the closures 8, 9; it is removably secured in the closure 9 by a nut 13 and when so secured is prevented from endwise movement by a shoulder abutting against the inner face of the closure 9. The other end of the shaft 12 mounted in the closure 8 is of a section other than circular, as is also the portion of the shaft between the inner faces of the closures. Mounted on the outer face of the closure 8 in line with the shaft is a bearing 14 for the shaft 15. The shaft 15 is, from its inner end, hollow for a portion of its length and at its outer end is provided with, or adapted for the reception of means by which it may be rotated. The closure 8 is adapted to receive the inner end of the shaft 15 which internally is of a section to engage the outer end of the shaft 12. The two shafts 12, 15 are thus coupled together and when rotary motion is imparted to the shaft 15 the shaft 12 is moved correspondingly. The shaft 12 serves to carry the two strainers constituting a set. Each strainer comprises a plurality of discs 17 each having a plurality of holes or openings therethrough, namely, a centrally disposed hole 18 of a section and size similar to that of the shaft 12 and by which it is mounted thereon and coupled thereto so that the rotary motion of the shaft 12 is imparted to the discs 17 and a circular row of holes 19. The holes 19 are so disposed that when the discs are mounted on their carriers as hereinafter described the holes 19 in the several discs coincide and constitute ducts. 26 are rods, three being employed in the construction illustrated in the drawings, which extend the length of the casing 1 and are mounted at their one end in the closure 9 and at their other ends enter holes in the closure 8. The rods 26 constitute carriers for the intermediate members 28 arranged between each pair of discs 17. Each intermediate member 28 consists of a circular ring, for example, of thin springy metal, having three lugs projecting outwards therefrom, the lugs having holes by which they are threaded on to the rods 26. The faces of the intermediate members contact with the adjacent faces of the discs between which they are mounted.

The ducts formed by the holes 19 are in communication at one end with the groove 10 in the closure 8 or 9.

The two strainers are separated by a member 23 mounted on the shaft 12 and at one end of the casing is provided a casting 29 which is a sliding fit in a recess in the closure 8. The casting 29 is mounted on the shaft 12 so as to rotate therewith and is also made with openings therethrough for connection of the ducts formed by the holes 19 with the groove 10. The casting 29 is provided for the purpose of compensating for expansion and contraction of the discs when in use.

For additional support and for guiding the strainers when being inserted into or withdrawn from the casing 1, rings 30 are spaced apart along the strainer. In Fig. 1 three of such rings are shown, that at the left hand being mounted on the casting 29 and being prevented from endwise movement by pins 32ᵇ which pass through the rods 26. The middle ring 30 is mounted on the carrier 23 and the other ring at the opposite end is also mounted on a carrier. Each ring has two cut-away portions 31 diametrically disposed as illustrated in Fig. 3, by means of which they engage rails 32 mounted within the casing 1 as shown at 32ᵃ. The rings 30 are formed with holes through which the rods 26 extend.

The discs 17 preferably have a cut-away portion 21 in the outside edge and a similar cut-away portion 22 on the inside edge. Similarly, the intermediate members may have a cut-away portion 33 on the inside edge or a cut-away portion 34 on the outside edge.

In operation the fluid to be strained passes into the casing through the inlet 2 thence radially between the surfaces of the discs 17 and the contacting surfaces of the intermediate members 28 to the ducts 19 and away through the grooves 10 and ducts 11 to the outlet 3, any material separated from the fluid being intercepted at the edges of the discs 17; if and when these edges become coated the shaft 12 is rotated through the shaft 15, whereby the discs 17 are moved in relation to the intermediate members 28. This relative movement of the discs and the intermediate members causes any matter separated from the fluid to be removed from the edges of the discs, whence it falls into the sump 6 and may be removed either through the drain connection 7 or the hand holes. Should any dirt get between the discs 17 and the members 28 it will be rolled along until it reaches a cut-away portion 21, 22, 33 or 34, when it will be removed.

With the construction described the two strainers mounted on the shaft 12 may be withdrawn as an entity by removal of the means securing the closure 9 in position and the withdrawal of such closure together with the shaft 12 and rods 26 mounted thereon and carrying the discs 17 and the intermediate members 28, endwise from the casing. Alternatively, by mounting the rods 26 in the closure 8 and omitting the nut 13 the two strainers mounted on the shaft 12 may be withdrawn as an entity by removal of the means securing the closure 8 in position and the withdrawal of such closure together with the parts mentioned thereon.

It will, of course, be understood that though an embodiment of the invention has been described in which two sets of strainers each comprising two strainers placed end to end are mounted in a common casing, side by side and parallel to one another, many modifications may be made without departing from this invention. For example, only one strainer may be employed, or if desired, more than two strainers may be mounted in line.

As has been mentioned, Figure 4 shows one form of disc or plate. Figure 5 shows an intermediate member which only has one lug projecting outwards therefrom but which also has a diametral member 71 having a central hole to encircle the shaft 12. With this form of intermediate member only one rod 26 is necessary. Figure 6 shows a modification of the invention in which, instead of the discs 17 and the intermediate members 28 being mounted co-axially, they are mounted eccentrically. With this construction it is found that in some circumstances the matter collected at the edges of the discs during straining is more easily removed when relative movement between them and the intermediate members takes place.

It will be understood that if desired separators may be arranged between adjacent discs 17, in which case they may take the form of washers threaded, for example, on the shaft 12 and of substantially the same thickness as the material of the intermediate members; similarly separators may be arranged between the intermediate members in which case they may take the form of washers threaded on the rods 26 and of substantially the same thickness as the discs or plates 17; or the separators may be integral with the discs or the intermediate members and formed, for example, by pressing up the metal thereof.

Further modifications of the invention may be made; thus, the intermediate members may be formed of plates of various external shapes, for example, rectangular or triangular, with a circular hole therethrough and also a hole or holes at their outer edges for mounting the plates on a rod or rods 26, and in some circumstances the plates may be built up of sections.

Figure 7 shows a modification of the invention in which the intermediate members 28 of ring form are cast integral with a pair of U-shaped members 35 arranged diametrally. The discs 17 of which one is shown in dotted lines are slid into the spaces between the rings 28. When in place the shaft is threaded through the discs 17 with or without separators. The U-shaped members 35 engage rods similar to 26 illustrated in Figures 1, 2 and 3.

The strainer illustrated in Fig. 8 is constructed of a casting 36 in which a plane wall 37 has a pair of coaxial circular slots 38, 39. A ring 40 projects into the slot 38 and a ring 41 into the slot 39, the surfaces of the rings contacting with the walls of the slots. The rings 40, 41 are mounted on a carrier comprising a disc 42 carried on a spindle 43 having an operating handle 44, and said spindle is mounted in a cover plate 45. 2 is the inlet for the fluid which passes through holes 46 in the rings 40, 41 and thence between the contacting surfaces of the rings and the walls of the slots; the strained fluid passes through a chamber 47 in the lower end of the casting 36 to the outlet 3. Any matter removed from the fluid collects at the edges of the slots 38 or 39, and by operating the handle 44 a cleaning action is brought about.

In the form of the apparatus illustrated in Figure 9, a casting 48 has a plane wall 49 through which are formed a number of holes 50. A flat plate 51 contacts with the surface of the plane wall 49. This plate has a number of holes 55 and is mounted on a spindle 52 which is journalled in a cover plate 53 and provided with a handle 54. The holes 55 do not correspond or register with the holes 50. 2 is the inlet for the fluid which passes through the holes 55 and between the contacting surfaces of the plate 51 and the wall 49 to the holes 50 and thence to the outlet 3. A cleaning action is effected by rotating the plate 51 in relation to the wall 49.

Referring to Fig. 10, within a casing 55$^a$ is mounted a hollow cylindrical member 56 which has a plurality of holes or apertures 57 therethrough. Within the cylindrical member 56 is arranged a second cylindrical member 58. 56 is carried on a plate 59 which is mounted on a spindle 60 journalled in a cover plate 62 and having a handle 61. The inner cylindrical member 58 has outwardly projecting rings 63 which are so spaced that they are one on each side of a slot 57 in the cylindrical member 56 and the arrangement is such that the outer edges of the rings 63 contact with the inner wall of the cylindrical member 56. The inlet for fluid to the casing 55ª is indicated in dotted lines at 2. The fluid then passes through the slots 57 between the inner surface of the cylindrical member 56 and the contacting edges of the projecting rings 63 to the outlet 3. By operating the handle member 61 relative movement takes place between the ring 63 and the cylindrical member 56, whereby a cleaning action is brought about.

In a modification of the invention illustrated in Fig. 11 on a shaft 64 mounted to rotate in bearings in the cover and end wall of a casing 65 are mounted a number of rings 66. The rings are secured on rods 67 and are spaced apart by washers 68 and intermediate rings 69. A second series of rings 70 are mounted in the casing outside the rings 66 and are similarly spaced, the outer edges of the rings 66 contact with the inner edges of the rings 70. 2 is the inelt for fluid which passes into the casing and thence between the inner edges of the rings 70 and the contacting outer edges of the rings 66 to the outlet 3. The shaft 64 is provided with means for rotating it whereby a relative movement between the rings 66 and the rings 70 is obtained to loosen any separated matter held at their adjacent edges.

The apparatus according to the present invention is found to be particularly effective for such fluids as petrol, or for gaseous fluids.

What we claim is:—

1. A strainer for fluid comprising a member of impervious material having a slot and a second member of impervious material extending into and the full length of the slot, and in contact with the adjacent walls of the slot, the contacting surfaces of the members being movable one over the other, and between which contacting surfaces the fluid is passed.

2. A strainer for fluid comprising a member of impervious material having a plurality of slots and a plurality of second members of impervious material extending one into each slot and the full length of the slot and in contact with the adjacent walls of the slots, the contacting surfaces of the members being movable one over the other, and between which contacting surfaces the fluid is passed.

3. A strainer for fluid comprising a casing having an inlet opening and an outlet opening for the fluid, a straining wall mounted therein constituted of a plurality of plane discs of impervious material mounted side by side on a carrier, each having a hole therethrough and spaced apart to form endless peripheral slots, and a plurality of intermediate members of impervious material mounted on a carrier, one extending into and the full length of each slot with its surfaces in contact with the adjacent walls of the slot, said discs and intermediate members being relatively movable so as to cause the contacting surfaces to move one over the other, and between which contacting surfaces the fluid is passed, the duct formed by the holes through the discs being in connection with an opening in the casing, an opening in the end wall of the casing opposite the end of the straining wall, and a closure for said opening in which the straining wall and carrier for the intermediate members are mounted.

4. A strainer for fluid comprising a casing having an inlet opening and an outlet opening for the fluid, a straining wall mounted therein constituted of a plurality of plane discs of impervious material mounted side by side on a shaft each having a hole therethrough, and spaced apart to form endless peripheral slots, a plurality of intermediate members of impervious material mounted on a rod external to the straining wall one extending into and the full length of each slot with its surfaces in contact with the adjacent walls of the slot, said discs and intermediate members being relatively movable so as to cause the contacting surfaces to move one over the other, and between which contacting surfaces the fluid is passed, the duct formed by the holes through the discs being in connection with an opening in the casing, an opening in the end wall of the casing opposite the end of the straining wall and a closure for said opening in which the straining wall and rod carrying the intermediate members are mounted.

5. A strainer for fluid comprising a casing having an inlet opening and an outlet opening for the fluid, a straining wall mounted therein constituted of a plurality of plane discs of impervious material mounted side by side on a carrier each having a hole therethrough and spaced apart to form endless peripheral slots and a plurality of intermediate members of impervious material mounted on a carrier one extending into and the full length of each slot with its surfaces in contact with the adjacent walls of the slot, said discs and intermediate members being relatively movable so as to cause the contacting surfaces to move one over the other, and between which contacting surfaces the fluid is passed, the duct formed by the holes through the discs being in connection with an opening in the casing, rods within the casing extending longitudinally thereof, rings mounted on the straining wall having cut-away portions to engage said rods, an opening in the end wall of the casing opposite the end of the straining wall and a closure for said opening in which the straining wall and the carrier for the intermediate members are mounted.

6. A strainer for fluid comprising a casing having an inlet opening and an outlet opening for the fluid, a plurality of straining walls mounted therein in line, each constituted of a plurality of plane discs of impervious material mounted side by side on a common carrier and each having a hole therethrough and spaced apart to form endless peripheral slots, a plurality of intermediate members of impervious material mounted on a carrier one extending into and the full length of each slot with its surfaces in contact with the adjacent walls of the slot, said discs and intermediate members being relatively movable so as to cause the contacting surfaces to move one over the other, and between which contacting surfaces the fluid is passed, the duct formed by the holes through the discs being in connection with an opening in the casing, an opening in the end wall of the casing opposite the end of the straining walls and a closure for said opening in which the straining walls and the carriers for the intermediate members are mounted.

7. A strainer for fluid comprising a casing having an inlet opening and an outlet opening for the fluid, a plurality of straining walls mounted therein in line each constituted of a plurality of plane discs of impervious material mounted side by side on a common carrier and each having a hole therethrough and spaced apart to form endless peripheral slots, a plurality of intermediate members of impervious material mounted on a carrier one extending into and the full length of each slot with its surfaces in contact with the adjacent walls of the slot, said discs and intermediate members being relatively movable so as to cause the contacting surfaces to move one over the other and between which contacting surfaces the fluid is passed, the duct formed by the holes through the discs being in connection with an opening in the casing, rods within the casing extending longitudinally thereof, rings mounted on the straining walls having cut-away portions to engage said rods, an opening in the end wall of the casing opposite the end of the straining wall, and a closure for said opening in which the straining walls and the carrier for the intermediate members are mounted.

Dated this 2nd day of June, 1924.

FRANK CHRISTIAN FULCHER.
WILLIAM ROBERT BELDAM.